Jan. 23, 1968  O. W. BODOR  3,364,850
APPARATUS FOR AUTOMATICALLY MARKING RECEPTACLES
Filed March 31, 1966  6 Sheets-Sheet 1

INVENTOR
OLIVER WILLIAM BODOR
BY Bacon & Thomas
ATTORNEYS

INVENTOR
OLIVER WILLIAM BODOR

BY Bacon & Thomas
ATTORNEYS

Jan. 23, 1968    O. W. BODOR    3,364,850
APPARATUS FOR AUTOMATICALLY MARKING RECEPTACLES
Filed March 31, 1966    6 Sheets-Sheet 4

INVENTOR
OLIVER WILLIAM BODOR

BY Bacon & Thomas

ATTORNEYS

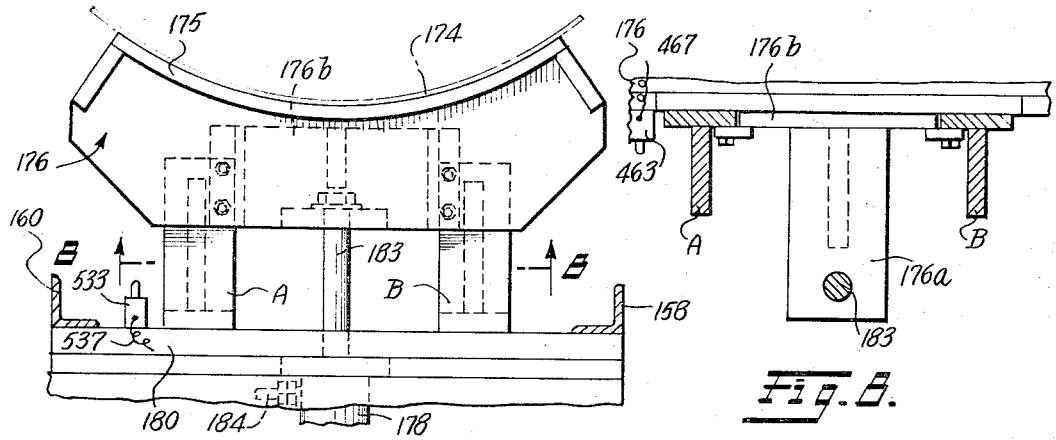
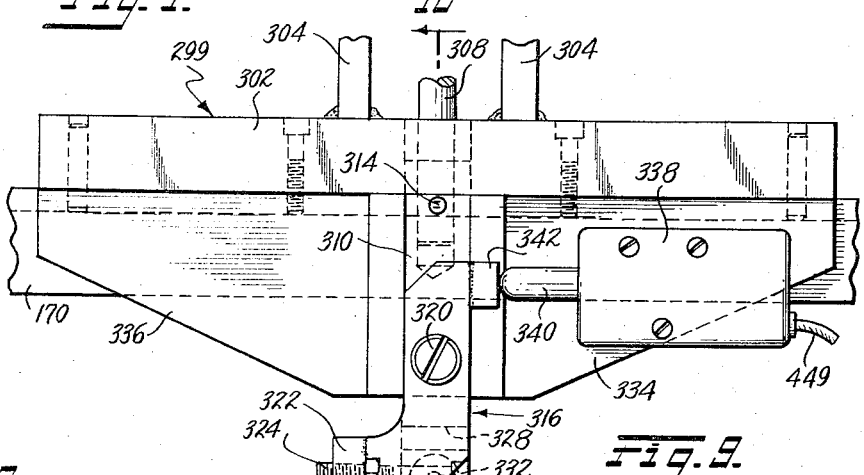
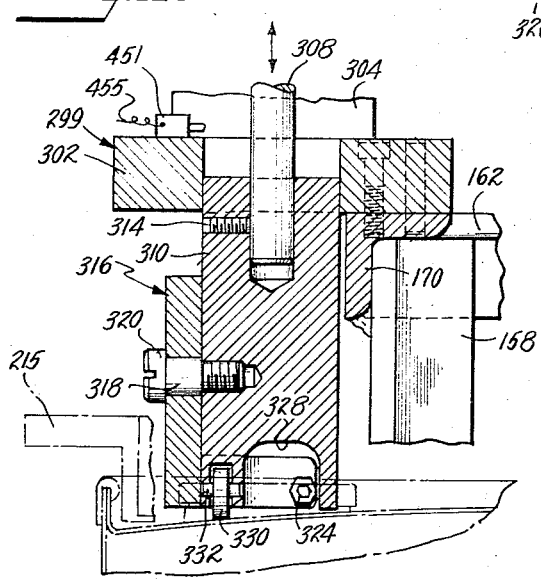
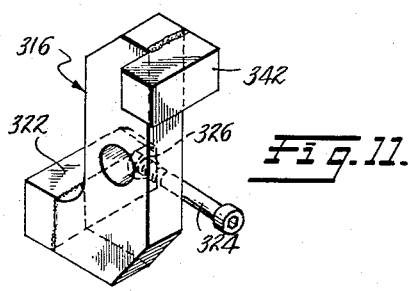

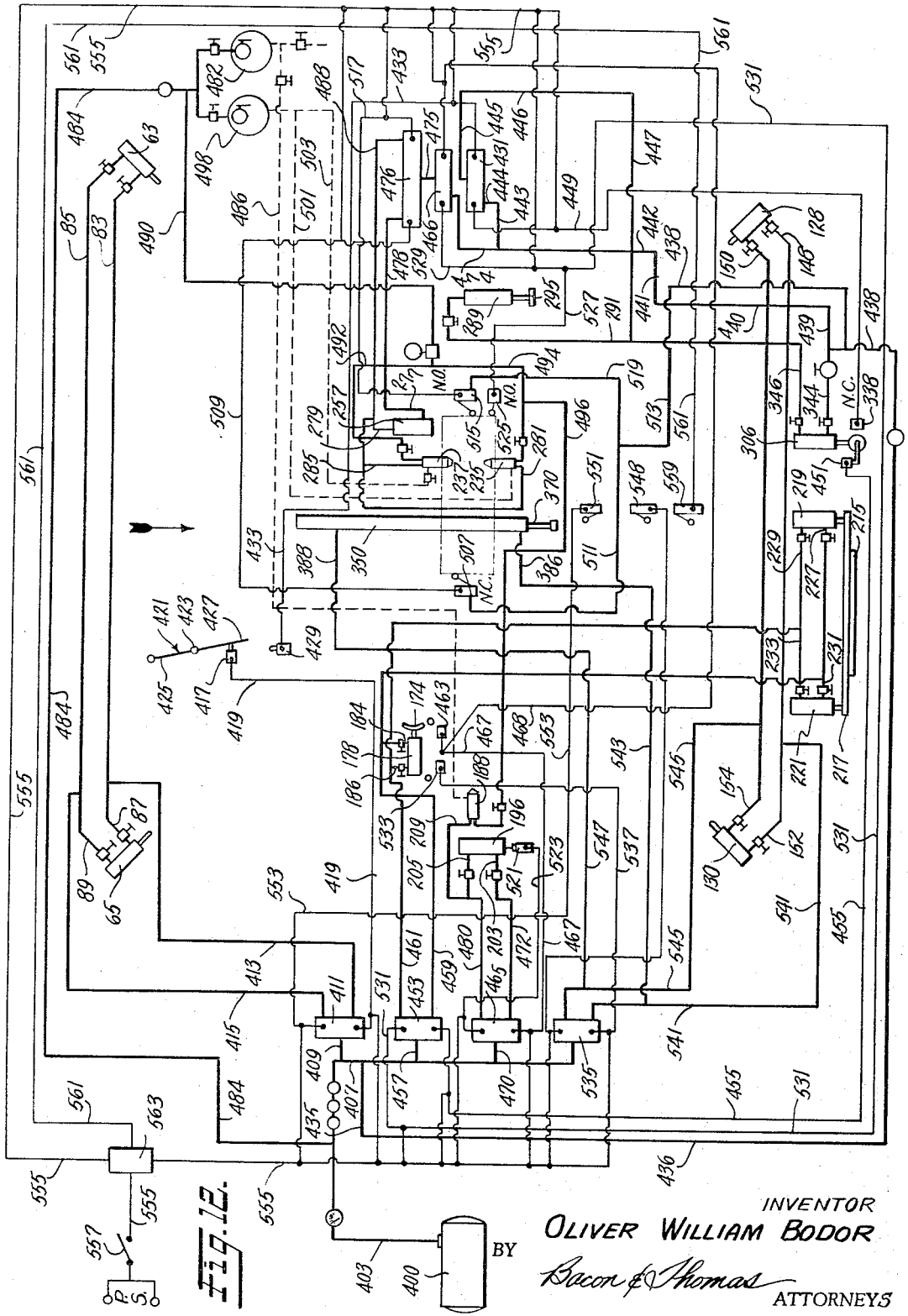

United States Patent Office 3,364,850
Patented Jan. 23, 1968

3,364,850
APPARATUS FOR AUTOMATICALLY
MARKING RECEPTACLES
Oliver William Bodor, Fort Lauderdale, Fla., assignor to
Apex Machine Company, Fort Lauderdale, Fla.
Filed Mar. 31, 1966, Ser. No. 539,094
22 Claims. (Cl. 101—35)

This invention relates to apparatus for making receptacles and more particularly to improvements in apparatus for automatically marking a plurality of receptacles, such as drums, one at a time in rapid succession.

The apparatus of the present invention is employed to mark the side of a receptacle such as a drum or the end of a receptacle or to mark both the side and the end simultaneously with paint, ink or other marking material in one or more colors. Receptacles, such as drums, are advantageously supplied to the marking apparatus by means of a conventional conveyor and, after being marked, are moved away from the marking apparatus on a conventional discharge conveyor. In the one form of the invention as described and illustrated herein by way of example, the drums or receptacles are furnished to the apparatus in a vertical position, standing on one end and are discharged from the apparatus in the same position. However, it will be obvious to one skilled in the art, that the receptacles may be furnished to the apparatus while disposed in other positions such as, for example, lying on their side and marked while in this position.

Briefly, the marking apparatus as shown and described herein operates in the following manner. A drum, for example, moves through an entrance gate on a support conveyor to a marking station whereupon the entrance gate closes, confining the drum between an exit gate and the entrance gate, and preventing the next drum to be marked from entering the marking station. Upon closing of the entrance gate, the drum may be rotated at the marking station in order to orient the drum for marking with respect to the large bung normally mounted in the end of the drum. When the drum is properly oriented, a stencil or marking guide is moved into engagement with the side of the drum or a stencil may be moved into engagement with one end of the drum, or both side and end stencils may be moved simultaneously into engagement with the drum. Paint or other marking material applying means, which may include spray guns, fountain type brushes, or rollers, is then moved across the stencils to apply marking material thereto and to the surface of the drum exposed through the stencils for lettering and/or ornamenting the drum in one or more colors. After the drum is marked, the stencils are moved to a position out of contact with the drum and the exit gate is opened. The drum may be removed from the marking apparatus through the exit gate by a power-actuated ejector, whereupon the exit gate is closed and the entrance gate is opened to receive the next drum to be marked. The marking apparatus is constructed to be adjustable in order to accommodate drums or other receptacles of varying shapes and sizes.

It is an object of this invention to provide a marking apparatus for automatically marking in rapid succession a series of receptacles of uniform size furnished thereto.

An important object of this invention is to provide an automatic marking apparatus adapted to simultaneously mark the side and the end of receptacles.

Another object of the invention is to provide automatic marking apparatus adapted to properly orient, in the apparatus, receptacles to be marked.

A further object of the invention is to provide marking apparatus for automatically marking in rapid succession or more colors.

It is also an object of the invention to provide marking apparatus in which a series of operations are automatically carried out in a predetermined sequence without the attention of an operator.

These and other objects of the invention will become more apparent from the following specifications and claims when taken in conjunction with the drawings in which:

FIG. 7 is an enlarged, fragmentary, horizontal, sectional view of the front stencil slide mechanism, taken on the line 7—7 of FIG. 3;

FIG. 8 is a fragmentary, vertical, sectional view taken on the line 8—8 of FIG. 7;

FIG. 9 is an enlarged, elevational view of the drum positioning mechanism taken on the line 9—9 of FIG. 2;

FIG. 10 is a fragmentary, vertical, sectional view taken on the line 10—10 of FIG. 9;

FIG. 11 is a perspective view of the switch actuating lever shown in FIG. 9; and FIG. 12 is a schematic diagram of the wiring, fluid and marking material applying layout of the drum stenciling machine.

Figure 1:
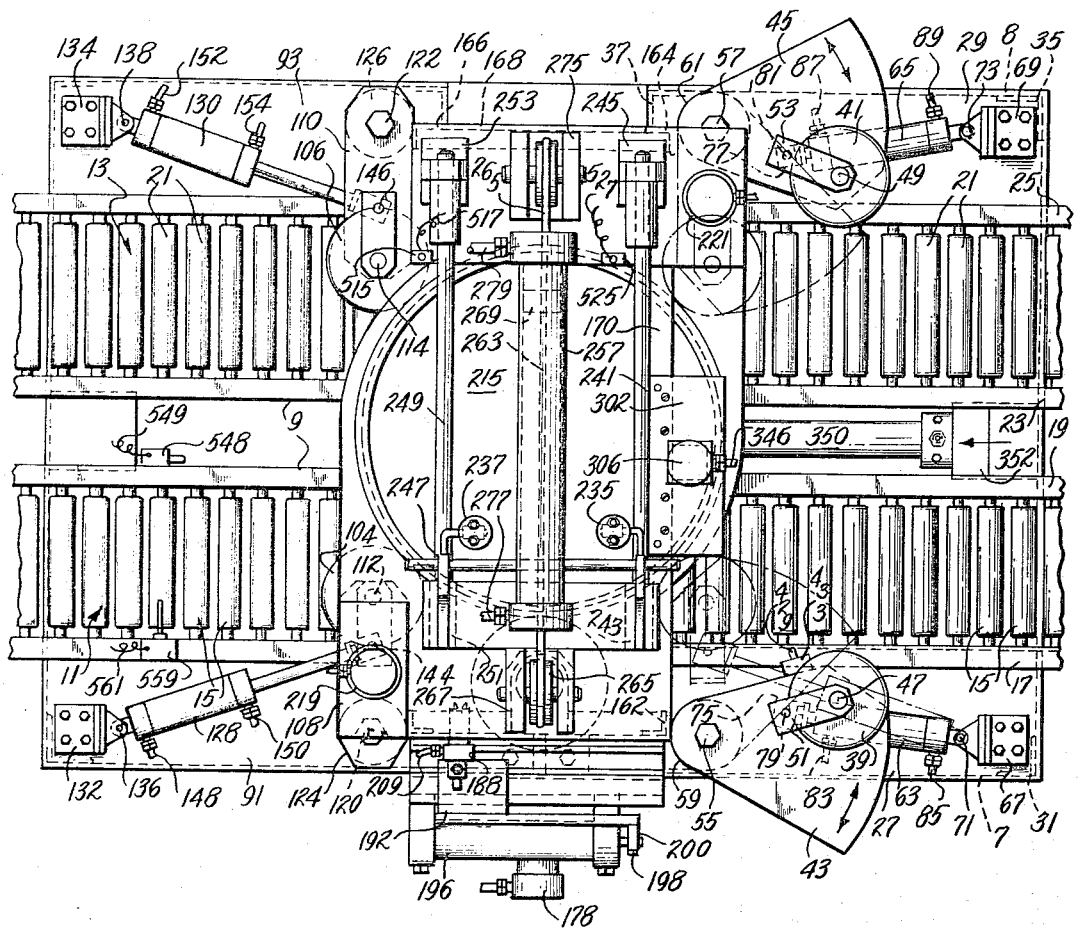
FIG. 1 is a top plan view of the drum stenciling machine of the present invention.

The present marking apparatus includes an open rectangular frame 1, formed of angle irons supported on the legs 3. A pair of angle irons 5 and 6, which are spaced a short distance apart and are parallel with the side members 7 and 8 of the frame, are rigidly mounted on the ends of the frame, reinforcing the frame and providing therebetween a guideway 9.

A pair of parallel roller conveyors 11 and 13 are spaced a short distance apart and extend the length of the frame. The rollers 15 of the conveyor 11 are mounted between a pair of spaced parallel channel irons 17 and 19, rigidly secured to the ends of the frame 1, and the rollers 21 of the conveyor 13 are likewise supported between a pair of spaced parallel channel irons 23 and 25, also rigidly secured to the ends of the frame 1. The rollers 15 and 21 of the conveyors may be mounted in a conventional manner for rotation in suitable bearings, not shown, fixed in openings provided in the webs of the respective channel irons.

A pair of flat steel plates 27 and 29 extend lengthwise on opposite sides of the frame 1 at the entrance end thereof. The plate 27 is supported above the side member 7 by short steel columns 31 and 33, while the plate 29 is supported above the side member 8 by the short steel columns 35 and 37.

A pair of entrance gate wheels 39 and 41 are disposed above the steel plates 27 and 29, respectively, and provide an entrance gate for the marking apparatus. The wheels 39 and 41 are disposed in a horizontal position and are mounted on the arcuate-shaped plates 43 and 45 for rotation about vertical axes on pins 47 and 49 which extend upward from the plates 43 and 45, respectively, to L-shaped brackets 51 and 53, welded to the upper surface of the plates 43 and 45. The plates 43 and 45 are mounted for pivotal movement in a horizontal plane, between an open position as shown in solid lines in FIG. 1, and a closed position as shown in broken lines, on the pivot pins 55 and 57 extending vertically upwardly from bearings 59 and 61 rigidly secured to the upper surface of plates 27 and 29.

A pair of reciprocating fluid motors, 63 and 65, are employed to move the entrance gate wheels 39 and 41 and the arcuate-shaped plates 43 and 45 between the open and the closed position. The closed ends of the cylinders of the fluid motors 63 and 65 are pivotally connected to brackets 67 and 69, bolted to the upper surface of the plates 27 and 29, by vertically extending pins 71 and 73. The outer ends of the piston rods of the fluid motors 63 and 65 are pivotally connected to the L-shaped brackets 75 and 77, rigid with the lower surface of the plates 43 and 45, by means of pivot pins 79 and 81. A suitable source of fluid under pressure, preferably air, is connected to either end of the fluid motor 63 by flexible hoses 83 and 85; and to either end of fluid motor 65 by flexible hoses 87 and 89. While the fluid motors employed in the operation of the present marking apparatus are preferably operated by air under pressure, it will be apparent that liquid could be employed or that other power means could be substituted for the fluid motors.

Adjacent to the exit end of the apparatus, a pair of flat steel plates 91 and 93 are supported lengthwise on the opposite sides of the frame 1. The plate 91 is supported above the side number 7 on short steel columns 95 and 97, while the plate 93 is supported above the side number 8 by the steel columns 99 and 102.

A pair of exit gate wheels 104 and 106 are mounted above the plates 91 and 93, respectively. The wheels 104 and 106 are disposed in a horizontal position and are mounted on the arms 108 and 110 for rotation about vertical axes on pins 112 and 114 which extend upwardly from the plates 91 and 93, respectively, to L-shaped brackets 116 and 118 welded to the upper surface of the arms 108 and 110.

The arms 108 and 110 are mounted for pivotal movement in a horizontal plane between a normally closed position and an open position on pivot pins 120 and 122 extending vertically upwardly from bearings 124 and 126 rigidly secured to the upper surface of plates 91 and 93.

The exit gate wheels 104 and 106 are shown in FIG. 1 in the closed position. When in the open position, these wheels assume a position corresponding to the position of entrance gate wheels 39 and 41, as shown in solid lines.

A pair of reciprocating fluid motors 128 and 130 are employed to move the exit gate wheels 104 and 106 between the open and the closed position. The closed end of the cylinders of the fluid motors 128 and 130 are pivotally connected to the brackets 132 and 134, bolted to the upper surface of the plates 91 and 93, by the vertically extending pins 136 and 138. The outer ends of the piston rods of the fluid motors 128 and 130 are pivotally connected to brackets 140 and 142, rigid with the lower surface of the arms 108 and 110, by means of pivot pins 144 and 146. A source of air under pressure is connected to either end of the fluid motor 128 by the flexible hoses 148 and 150, and to either end of the fluid motor 130 by the flexible hoses 152 and 154.

When the entrance gate wheels 39 and 41 and the exit gate wheels 104 and 106 are in the closed position, they are arranged to engage the outer surface of a receptacle and to maintain it confined in a marking station supported on the conveyors 11 and 13. While stencils are utilized and shown in this embodiment of the invention, it will be apparent that other types of lettering and/or decorating processes, such as silk screening, printing or steel stamping, could be readily adapted to the apparatus. The stencils and other apparatus required for automatically marking a receptacle positioned at the marking station, are supported on an open steel frame, generally designated by the numeral 156, rigidly mounted on the upper surface of the adjacent inner ends of the flat steel plates 27, 29, 91 and 93. The frame 156 includes a pair of parallel, vertically extending angle irons 158 and 160 fixed to the upper surface of the steel plates 27 and 91. A horizontal angle iron 162 connects the upper ends of the angle irons 158 and 160 together. Another pair of parallel, vertically extending angle irons 164 and 166 are rigid with the upper surface of steel plates 29 and 93 and are connected together at their upper ends by a horizontal angle iron 168. The upper ends of the angle irons 158 and 164 are connected together by a transverse angle iron 170, while the upper ends of the angle irons 160 and 166 are connected together by a transverse angle iron 172.

In the present embodiment of the invention, a curved stencil 174 for marking the side wall of a receptacle is detachably mounted in a vertical position in a correspondingly curved frame 175 forming the upwardly extending, forward portion of a generally Z-shaped bracket 176. A reciprocating fluid motor 178 is mounted on a transverse member 180, extending between the vertical angle irons 158 and 160. The outer end 182 of the piston rod 183 of the fluid motor 178 is adjustably secured to the lower end of the downwardly extending leg 176a of the Z-shaped bracket 176 for moving the bracket and the stencil 174 from a normally retracted position spaced from a receptacle to a projected position with the stencil in engagement with the side of the receptacle. The Z-shaped bracket 176 is supported on the upper surface of a pair of L-shaped brackets, A and B, fixed to the inner surface of the transverse member 180 and is guided for horizontal movement by a flat plate 176b rigid with the lower surface of the horizontal portion of the Z-shaped bracket 176 and positioned between the L-shaped brackets A and B. A source of air under pressure is connected to either end of the fluid motor 178 by the flexible hoses 184 and 186.

A conventional spray gun 188 is positioned adjacent to the stencil 174 and is mounted for reciprocation across the stencil, that is, from one side to the other side thereof, on an adjustable L-shaped rod 190 extending upwardly from a movable carriage 192. The carriage 192 slides on a flat, horizontal guide member 194 fixed to the upper surface of a support 195 extending outwardly from the angle irons 158 and 160, and secured thereto. The carriage 192 and the spray gun 188 mounted thereon are reciprocated horizontally between the angle irons 158 and 160 by means of a reciprocating fluid motor 196.

The fluid motor 196 is rigidly mounted in a horizontal position on the vertical angle iron 160, and the outer end 198 of the piston rod of the fluid motor is fixed to the carriage 192 by a connecting link 200, rigid with both the piston rod and the carriage. The spray gun 188 and the carriage 192 are normally maintained in the left hand position as viewed in FIG. 2. Air under pressure for actuating the fluid motor 196, is connected thereto by the flexible hoses 203 and 205.

A flexible marking material supply hose 207 is connected at one end to the spray gun 188 and at the other end to a source of marking material. The marking material could be ink, paint, plastic or other composition or substance. A flexible air hose 209 is connected at one end thereof to the spray gun 188 and at the other end thereof to a source of air under pressure.

The horizontal angle irons 162, 168, 170 and 172, which connect the upper ends of the vertical angle irons 158, 160, 164 and 166 together, form an open framework generally designated 210, for supporting the equipment necessary to mark the upper end of a receptacle. A rectangular, flat, steel plate 211 is secured to the upper surface of framework 210 at one side of the frame between the transverse angle irons 170 and 172 and over the angle iron 162. At the other side of the frame, a flat, rectangular, steel plate 213, is mounted on the upper surface of the framework 210 between the transverse angle irons 170 and 172, and over the angle iron 168.

In the present form of the invention, a circular stencil 215 for marking the upper end of the receptacle is removably mounted in an opening formed in the center portion of a large horizontal steel sheet 217. The stencil 215 and the steel sheet 217 are adapted to be moved between a normally retracted position, spaced above the upper end of the receptacle, and a projected position, with the stencil in engagement with the end of the receptacle, by means of a pair of fluid motors 219 and 221. The fluid motor 219 is mounted in a vertical position on the steel plate 211 and the outer end 223 of the piston rod of this fluid motor is adjustably secured to the steel sheet 217 adjacent to one corner thereof. The fluid motor 221 is mounted in a vertical position on the steel plate 213, and the outer end 225 of this fluid motor is adjustably secured to the steel sheet 217 adjacent to the corner thereof, which is diagonally across the sheet from said one corner.

The fluid motors 219 and 221 are adapted to be actuated simultaneously to move the stencil 215 between the normally retracted and the projected position by air under pressure furnished to the motors through a pair of flexible hoses 227 and 229, connected to the opposite ends of the fluid motor 219; and through the flexible hoses 231 and 233, connected to opposite ends of the fluid motor 221.

The end of the receptacle may be marked in one or more colors by means of a pair or a multiplicity of conventional spray guns such as 235 and 237. The spray gun 235 is adjustably mounted adjacent the upper end of a carriage 239 which is slidably mounted for transverse movement across the frame on a horizontal rod 241 supported at either end in brackets 243 and 245 fixedly secured to the upper surface of steel plates 211 and 213. The spray gun 237 is adjustably mounted adjacent the upper end of a carriage 247 for sliding movement transversely across the apparatus on a horizontal rod 249, disposed parallel with the rod 241 and supported in brackets 251 and 253, secured to the upper surface of steel plates 211 and 213. The carriages 239 and 247 are connected together by a rod 255 for simultaneous movement across the circular stencil 215.

A horizontal disposed fluid motor 257, supported at opposite ends by the brackets 259 and 261 secured to the upper surface of the steel plates 211 and 213, may be employed for moving the spray guns 235 and 237 across the stencil 215. A flexible cable 263 trained over a pulley 265, rotatably mounted between the opposite sides of a U-shaped bracket 267 secured to the upper surface of the steel plate 211, is connected at one end thereof to one side of the piston 269 of the fluid motor 257 and at the other end thereof to the rod 255. A flexible cable 271 trained over a pulley 273, rotatably mounted between the opposite sides of a U-shaped bracket 275 secured to the upper surface of the steel plate 213, is connected at one end thereof to the other side of the piston 269 of the fluid motor 257 and at the other end thereof to the rod 255. Air under pressure is connected to either end of the fluid motor 257 by the flexible hoses 277 and 279. The opposite ends of the fluid motor 257 are closed and the cables 263 and 271 extend therethrough in sliding, sealed relation.

The spray gun 235 is connected to a source of air under pressure by a flexible line 281, and to a source of marking material through a flexible line 283, while the spray gun 237 is connected to a source of air under pressure by the flexible line 285 and to a source of marking material by the flexible line 287. The spray guns 235 and 237 are mounted for both vertical and pivotal adjustment with respect to the carriages 239 and 247.

In order to properly orient the drum or receptacle to be marked, a rotary fluid motor 289, actuated by air supplied thereto under pressure through a pipe 291, is fixedly secured in a vertical position to the inner surface of an elongated, vertically extending bracket 293, rigidly mounted on the side member 7 of the frame 1 between the steel columns 33 and 95. A suitable drive wheel 295, having a peripheral surface of rubber or other friction material, is fixedly secured to the upper end of the drive shaft 297 of the fluid motor 289. The peripheral surface of the drive wheel 295 is adapted to engage the outer surface of the receptacle or drum to be marked and to rotate the drum in a manner to be described so that it will be oriented for marking in a predetermined position.

The drum, as shown, is preferably oriented for marking with respect to the large bung normally mounted in the end of a drum or other large receptacle. In order to stop rotation of the fluid motor 289 so that it will stop rotating the drum or receptacle to be marked when the large end bung is in a desired position, a mechanism for positioning or orienting the drum, generally designated by the numeral 299, is mounted above the marking station.

A heavy steel plate 302 is secured to the upper surface of the transverse angle iron 170 and is positioned substantially midway between side angle irons 162 and 168. An inverted U-shaped bracket 304 welded to the upper surface of the plate 302 supports a reciprocating fluid motor 306. The piston rod 308 of the fluid motor 306 extends downwardly through a suitable opening formed in bracket 304. A guide block 310 slidably mounted in an opening 312 formed in the plate 302, is adjustably connected to the lower end of the piston rod 308 by means of a set screw 314. A generally Z-shaped switch actuating lever or finger 316 is pivotally mounted against a side of the guide block 310 on the body portion 318 of a large screw 320 threaded into the side of the block. The lower end 322 of the finger 316 extends laterally across the lower end of the guide block 310 and an adjustable stop screw 324 extends through a threaded opening formed in the end 322. The stop screw 324 is adapted to engage the large bung of a rotating drum or receptacle and is secured in adjusted position by a lock nut 326. In order to accommodate the head portion of the stop screw 324, the lower end of the guide block 310 is provided with a generally U-shaped opening 328. A roller 330, mounted for rotation on a horizontal pin 332 fixedly secured in the lower end of the guide block 310, is adapted to engage and roll on the end of the drum or receptacle to be marked.

A pair of triangular gusset plates 334 and 336 are secured to the lower surface of the steel plate 302 on opposite sides of the guide block 310, and serve as guides for the guide block. A microswitch 338, having a switch-actuating plunger 340, is mounted on the gusset plate 334 with the plunger 340 in engagement with the lateral projection 342 formed on the upper end of the finger 316.

The opposite ends of the fluid motor 306 are connected to a source of air under pressure by the flexible hoses 344 and 346 for moving the guide block 310 between a normally retracted position spaced above a receptacle to be marked and a projected position with the roller 330 lowered into engagement of the upper end of the receptacle. The guide block 310 is constructed and arranged to be adjustably mounted on the lower end of the piston rod 308, so that the small bung of a rotating receptacle, normally provided in the end thereof, passes freely beneath the guide block while the large bung will engage the projecting end of the stop screw 324 and pivot the finger 316, resulting in stopping rotation of the drive motor 289, as will be explained more fully hereinbelow. The top stencil 215 is provided with an opening in alignment with the guide block 310 and the finger 316, so that they can pass freely through the stencil opening during the period required for orienting the receptacle. Obviously the receptacle to be marked could be oriented in relation to a side bung or closure or in relation to other means to be sensed on the receptacle, such as a seam, projection, depression or colored or radiant material, by employing suitable mechanical, electrical or optical sensing means.

Figure 4:
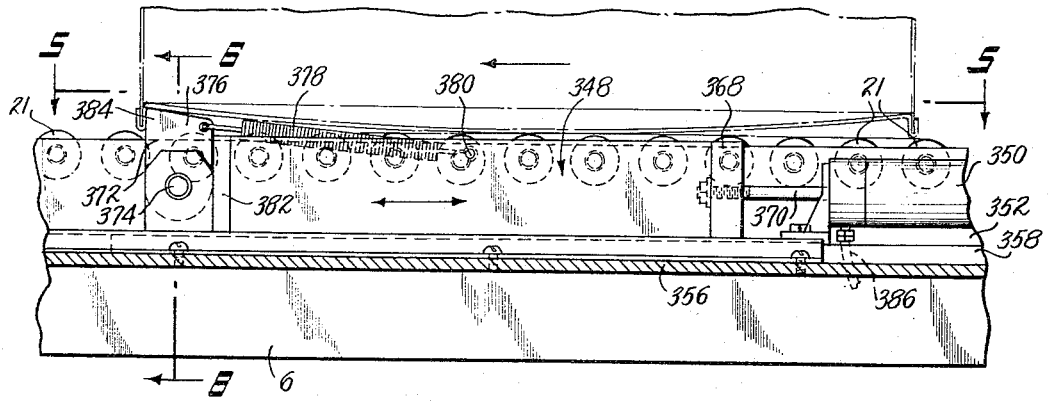
FIG. 4 is an enlarged, fragmentary, vertical, sectional view of the ejector mechanism, taken on the line 4—4 of FIG. 3.
Figure 5:
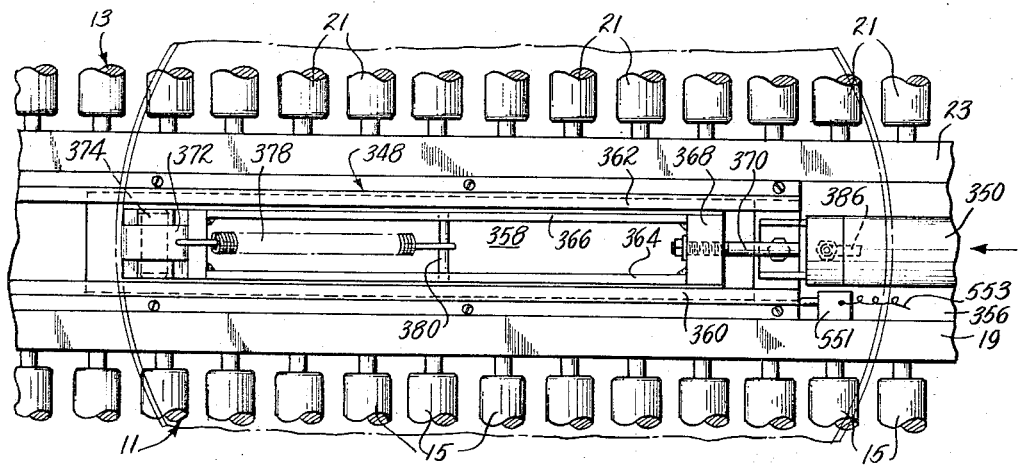
FIG. 5 is a fragmentary, horizontal, sectional view taken on the line 5—5 of FIG. 4.
Figure 6:
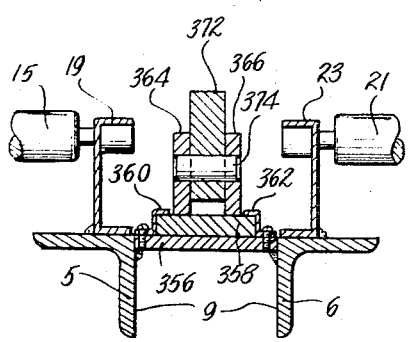
FIG. 6 is an enlarged, fragmentary, vertical, sectional view of the ejector latch mechanism taken on the line 6—6 of FIG. 4.

In order to remove a drum or receptacle from the marking station after it has been marked and when the exit gate wheels 104 and 106 have been moved to the open position, an ejector mechanism, generally designated 348, is provided below the lower end of the receptacle. This mechanism, as best illustrated in FIGS. 4, 5 and 6, includes a horizontally disposed fluid motor 350 secured to a vertical surface of a heavy metal block 352, welded or otherwise rigidly secured between the angle irons 5 and 6, adjacent the entrance end of the apparatus. A horizontal guide plate 356, disposed between the angle irons 5 and 6 and extending from the block 352 to the adjacent discharge end of the apparatus, is welded to the opposed surfaces of the angle irons 5 and 6 with the upper surface of the guide plate 356 flush with the upper surface of the said angle irons.

An elongated reciprocating slide 358, slides on the upper surface of the guide plate 356 between a pair of guideways 360 and 362, screw-fastened to the upper surface of the guide plate 356. The slide 358 includes a pair of spaced, upwardly extending, parallel, side walls 364 and 366. A transverse end wall extends between the side walls 364 and 366 at the end of the slide adjacent the fluid motor 350, and the outer end of the piston 370 of the fluid motor is fixedly secured to the transverse wall 368.

A pivoted latch 372 is mounted adjacent the other end of the slide 358 on a horizontal pivot pin 374, mounted between the parallel walls 364 and 366. The upper end of the latch 372 extends above the upper surface of the rollers 15 and 21 of the conveyors 11 and 13 and is formed with an inclined upper surface 376. The pivoted latch 372 is adapted to be pivoted in a counterclockwise direction from the vertical position as shown in FIG. 4 by the rim of a receptacle moving into the marking apparatus. After the rim of the receptacle passes over the latch 372, it will be returned to a vertical position beneath the receptacle by a tension spring 378 secured at one end to the latch 372, and at the other end to a pin 380 extending between the parallel side walls 364 and 366 of the slide 358. The latch 372 is prevented from moving past the vertical position by a vertical wall 382, extending upwardly from the upper surface of the reciprocating slide 358, engaging with the adjacent vertical wall of the pivoted latch 372. When in the vertical position, as shown in FIG. 4, the forward wall 384 of the latch 372 engages the inner surface of the bottom rim of a receptacle to be removed from the marking apparatus. The fluid motor 350 employed for reciprocating the slide 358 and ejector mechanism 348 is moved between a normally retracted position and a projected position by air under pressure connected thereto by flexible hoses 386 and 388.

The automatic operation of the various fluid motors described above in connection with the present marking apparatus may be controlled by conventional microswitches and conventional solenoid-actuated control valves in a manner to be described below.

Referring to FIG. 12, a source of fluid under pressure 400, preferably air, is connected by pipes 403 and 405 with an air supply header pipe 407 for furnishing air to a plurality of control valves. A pipe 409 connects the header pipe 407 with a solenoid-actuated valve 411, for controlling the flow of fluid under pressure through the pipes 413 and 415 to the inlet gate fluid motors 63 and 65. The pipe 413 is connected to the flexible hose 83 of fluid motor 63 and to the flexible hose 87 of the fluid motor 65, while the pipe 415 is connected to the flexible hose 85 of the fluid motor 63 and to the flexible hose 89 of the fluid motor 65.

At the start of each cycle of operation of the apparatus, the valve 411 is positioned to permit air under pressure to flow through pipe 413, and the flexible hoses 83 and 87 to maintain the entrance gate fluid motors 63 and 65 and the wheels 39 and 43 connected thereto in the open position for the entrance into the apparatus of a drum or receptacle to be marked. At this time, the exit gate fluid motors 128 and 130 and the exit gate wheels 104 and 106 attached thereto are maintained in the closed position.

A drum or receptacle, moving into the apparatus on the support conveyors 11 and 13, opens a closed microswitch 417 connected to the valve 411 by the power line 419, to move the valve 411 to vent pipe 413 and to permit air under pressure to flow through pipe 415 and the flexible hoses 85 and 89, and move the entrance gate motors 63 and 65 and the wheels 39 and 43 connected thereto from the open to the closed position.

The microswitch 417 may be mounted on the lower surface of the flat steel plate 91 and is operated by an arm 421, pivotally mounted intermediate the opposite ends thereof on a support 423, attached to the lower surface of the steel plate 91. The arm 421 is pivoted by a spring, not shown, to move one end 425 of the arm into engagement with the microswitch 417 for maintaining the switch in the closed position and the entrance gate fluid motors 63 and 65 in the open position at the start of each cycle. The other end 427 of the arm 421, which extends into the path of receptacles to be marked, is engaged by a receptacle moving into the apparatus, just before it comes to rest against the exit gate wheels 104 and 106. The receptacle pivots the arm 421 and moves the end 425 out of engagement with the microswitch 417, thus opening said switch to actuate said entrance gate motors 63 and 65 to the closed position.

As the entrance gate wheels 39 and 41 are moved to the closed position against the side of the receptacle in the apparatus, a closed microswitch 429, secured to the plate 43 and connected to a closed solenoid valve 431 by a power line 433, engages the side of the receptacle and is opened. Opening of the microswitch 429 results in moving the valve 431 to the open position and permits air under pressure furnished thereto through the air supply header 407 and the pipes 435, 436, 437, 438, 439, 440, 441, 442, 443 and 444 to flow through said valve and through pipes 445, 446 and 447 to the pipe 291 connected with the rotary fluid motor 289 and to the flexible hose 346 connected with the upper end of the fluid motor 306. The fluid motor 306 will be moved from the retracted position to a projected position lowering the wheel 330 into engagement with the end of the receptacle and positioning the stop screw 324 in the path of the large bung of the receptacle. At the same time, the fluid motor 289 will be rotated and its drive wheel 295 being in frictional engagement with the side wall of a receptacle will rotate the receptacle in a counterclockwise direction, as viewed in FIG. 1, until the large bung engages the end of the stop screw 324 and pivots and finger 316 sufficiently to permit the closed microswitch 338 to open.

The microswitch 338 is connected with the solenoid valve 431 by a power line 449 and opening of the microswitch 338 results in moving the valve 431 to the closed position, stopping rotation of the fluid motor 289 and moving the fluid motor 306 to the retracted position. The large bung of the receptacle is thus oriented with respect to both the side and top stencils.

As the fluid motor 306 is moved to the retracted position by the air pressure supplied thereto through the flexible hose 344, an open microswitch 451, which may be secured to the upper surface of the plate 302 and connected with a solenoid valve 453 by a power line 455, is engaged and closed by the upper end of the guide block 310. The solenoid valve 453 is normally positioned to permit air to flow therethrough from the air supply header 407 and the pipe 457 to the pipe 459 connected with the flexible hose 184 of the side stencil fluid motor 178 and to the flexible hoses 227 and 231 of the upper end stencil fluid motors 219 and 221, respectively, for maintaining each of the fluid motors 178, 219 and 221 in the retracted position.

Closing of the microswitch 451 results in moving the valve 453 to vent the pipe 459 and to permit air under pressure to flow through a pipe 461 connected to the flexible hose 186 of the fluid motor 178 and to the flexible hoses 229 and 233 of the fluid motors 219 and 221, thus moving said fluid motors and the side and end stencils into the projected positions in contact with the side and the end of the receptacle.

As the side stencil 174 reaches the projected position, a closed microswitch 463, secured to the lower surface of the Z-shaped bracket 176 and connected with a pair of solenoid valves 465 and 466 by the power lines 467 and 468, respectively, is moved to the open position, resulting in moving the side spray gun 188 and the end spray guns 235 and 237 across their respective stencils for marking the receptacle in the following manner.

Figure 2:
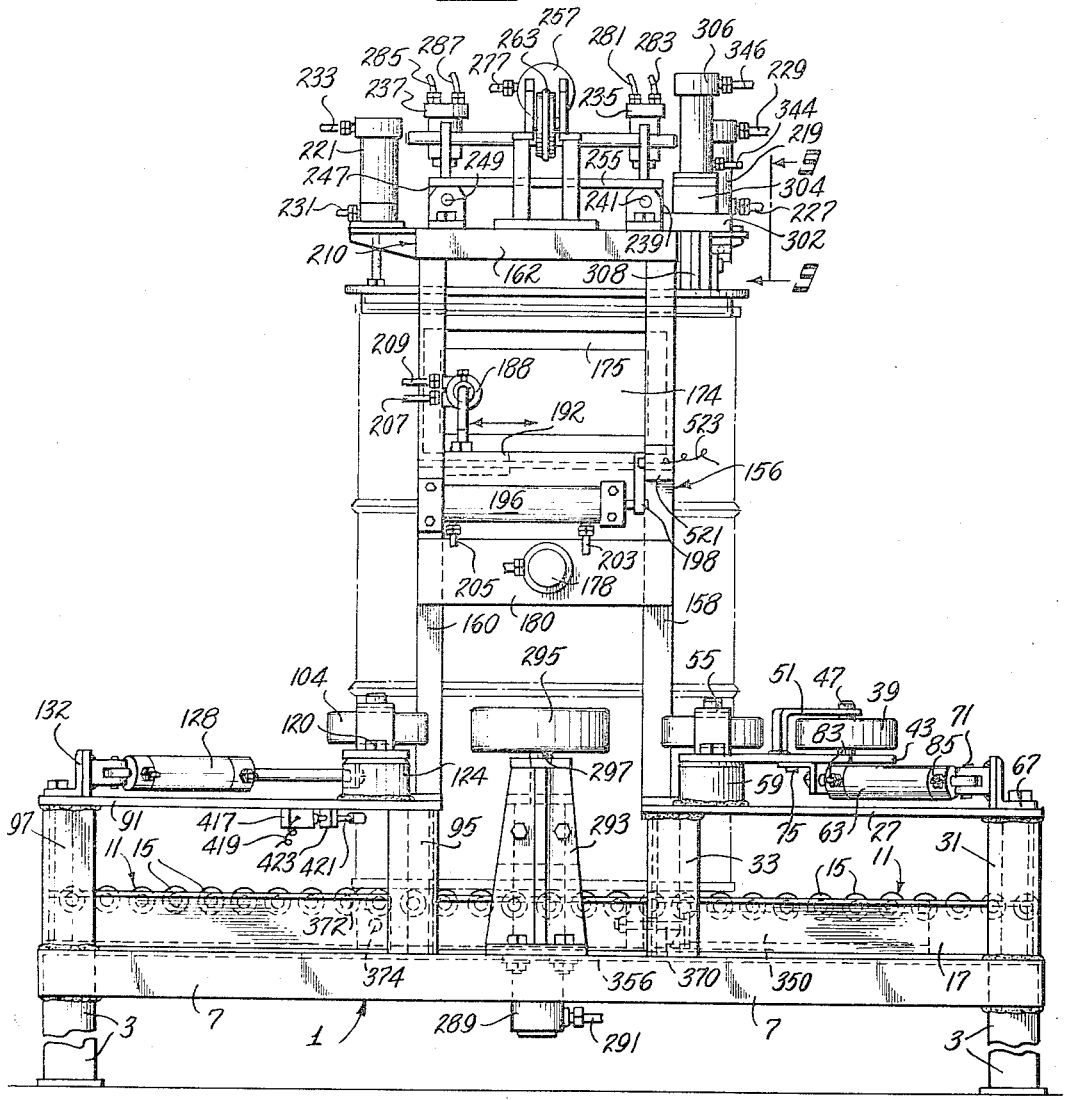
FIG. 2 is a front elevational view of the drum stenciling machine of FIG. 1.

The solenoid valve 465 is connected with the air supply header 407 by a pipe 470 and normally directs the flow of air under pressure to the pipe 472 connected with the flexible hose 203 of the fluid motor 196 to maintain the spray gun 188 in a retracted position to the left side of the side stencil 174 as viewed in FIG. 2.

The solenoid valve 466 is connected with the air supply pipe 442 by a pipe 474 and directs air under pressure through a pipe 475 and through a solenoid valve 476 to a pipe 478 connected to the flexible hose 277 of the fluid motor 257 to maintain this fluid motor and the spray guns 235 and 237 in a retracted position to one side of the end stencil as shown in FIG. 1.

A pipe 480 connects the solenoid valve 465 with the flexible hose 205 attached to the fluid motor 196 and with the air supply hose 209 connected with the side spray gun 188. Paint or other marking material in a supply reservoir 482, maintained under pressure by air furnished through a pipe 484 connected with said reservoir and with the air supply pipe 405, is furnished to the side spray gun 188 through a supply pipe 486.

A pipe 488 connects the solenoid valve 476 with the flexible hose 279 attached to the top fluid motor 257 and with the air supply hoses 281 and 285 connected with the spray guns 235 and 237, respectively. In addition, an air pipe 490 is connected with the air supply pipe 484 and with pipes 492 and 494 attached to the spray guns 235 and 237. The pipe 494 is connected with the side spray gun 188 by a pipe 496. Marking material in a supply reservoir 498, maintained under pressure by air supplied thereto through the pipe 484, is furnished to the top spray guns 235 and 237 through the supply pipes 501 and 503.

Opening of the microswitch 463 results in moving the valve 465 to vent the pipe 472 and connect the air supply pipe 470 to the pipe 480 to move the fluid motor 196 and the spray gun 188 across the side stencil 174 and to spray marking material from the spray gun 188 onto the side stencil 174 and receptacle, thus marking the side of the receptacle. Opening of the microswitch 463 also results in moving the valve 466 to vent the pipe 475.

The air under pressure in the flexible hose 281 moves the fluid motor 257 and the spray guns 235 and 237 across the end stencil 215 spraying marking material from the spray guns 235 and 237 onto the stencil 215 and receptacle thus marking the end of the receptacle. The marking material contained in the reservoirs 482 and 498 may be of the same color or of different colors as desired.

Figure 3:
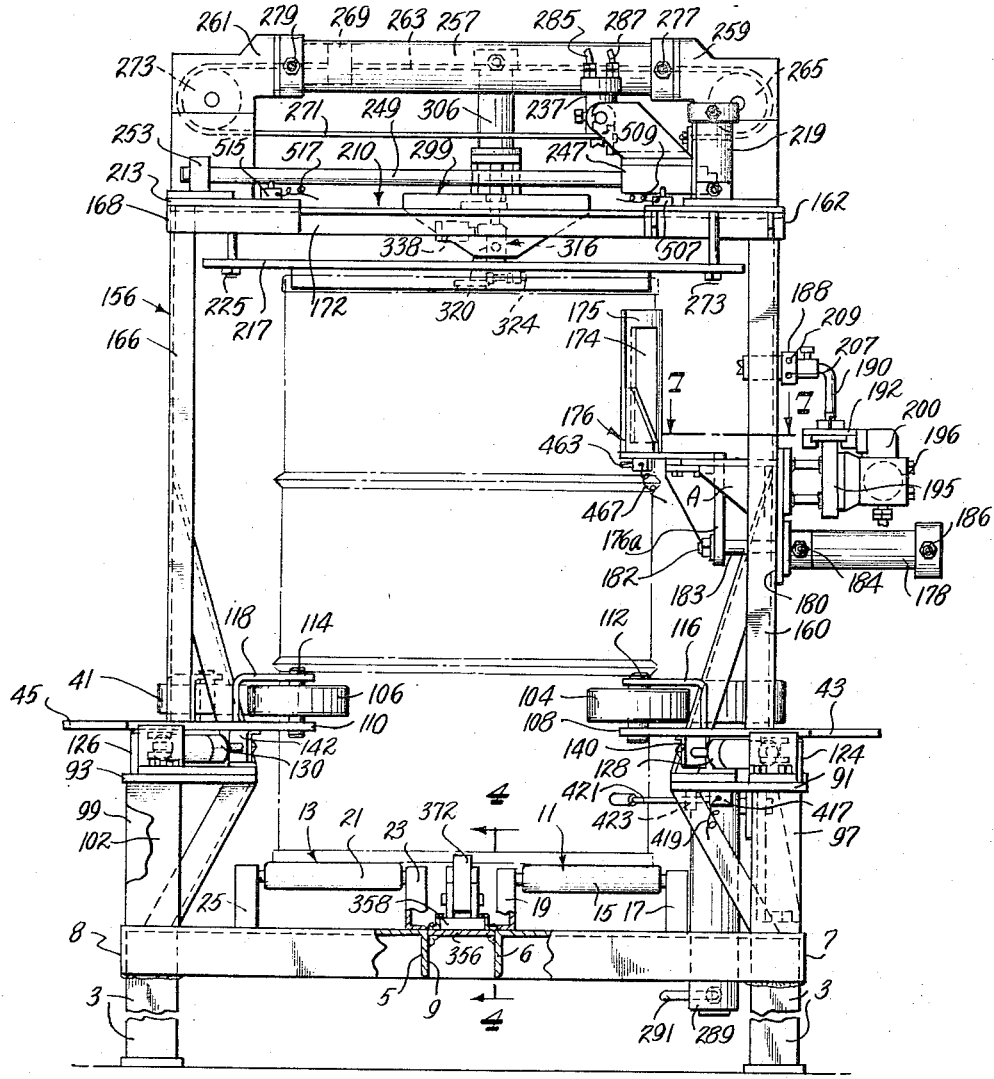
FIG. 3 is a side elevational view as viewed from the left side of FIG. 2.

A closed microswitch 507, connected with the solenoid valve 476 by a power line 509, is secured to the upper surface of the plate 211 for engagement with the carriage 297 when it is in the retracted position as shown in FIGS. 1 and 3. The microswitch 507 is connected by a pipe 511 with the air supply pipe 438 by a pipe 513.

An open microswitch 515, connected with the solenoid valve 476 by a power line 517, is secured to the upper surface of the plate 213 for engagement with the carriage 247 when it is in the projected position at the opposite side of the apparatus from that shown in FIGS. 1 and 3. The microswitch 515 is connected by a pipe 519 with the air supply pipe 513.

As the side spray gun 188 reaches the projected position at the end of its travel across the stencil 174, an open microswitch 521, mounted on the vertical angle iron 158 for engagement with the carriage 192 and connected with the solenoid valve 465 by a power line 523, is engaged and closed, resulting in moving the valve 465 to vent the pipe 480 and to permit the flow of air under pressure through the pipe 472 and flexible hose 203 to return the fluid motor 196 and the spray gun 188 to the retracted starting position.

The side spray gun 188 and the top spray guns 235 and 237 may be suitably actuated to spray marking material onto the side and end stencils and the receptacle in both directions of their travel across their respective stencils or one of more of said spray guns may be suitably controlled so as to spray marking material while moving in only one direction of travel across the respective stencil. Should it be desired to mark only the end or only the side of a receptacle, the appropriate spray gun or guns may be suitably actuated in the manner described above while the spray gun or guns not employed would not be actuated and, desirably, would be shut-off from or disconnected from its source of marking material. The apparatus could be modified to also mark the bottom end of receptacles in the same manner as that described above for marking the top end thereof.

As the end spray guns 235 and 237 and the carriage 247 reach the projected position at the end of their travel across the stencil 215, the carriage 247 engages the open microswitch 515 and an open microswitch 525, mounted on the plate 213 and connected with the valve 466 by the power lines 527 and 529 and connected with the valve 453 by the power lines 527 and 531.

Closing of the microswitch 525 results in moving the valve 453 to vent the pipe 461 and to permit air under pressure to flow through the pipes 459 and the flexible hose 184 to move the fluid motor 178 and the side stencil 174 to the retracted starting position out of engagement with the side of the receptacle. The air under pressure in pipe 459 also flows through the flexible hoses 227 and 231 to move the fluid motors 219 and 221 and the end stencil 215 to the retracted position out of engagement with the end of the receptacle.

The closing of the microswitch 525 also results in moving the valve 466 to permit air under pressure to flow through the pipe 475, the valve 476, pipe 478 and the flexible hose 277 to move the fluid motor 257 and the spray guns 235 from the projected to the retracted starting position.

As the fluid motor 178 and the side stencil 174 reach the retracted position, a closed microswitch 533 mounted on the transverse member 180 and connected with a solenoid valve 535 by a power line 537, is engaged by the Z-shaped bracket 176 and moved to the open position.

The solenoid valve 535 is normally positioned to permit air under pressure to flow therethrough from the supply header 407 and a pipe 539 to a pipe 541 which is connected with the flexible hoses 148 and 152 attached to the exit gate fluid motors 128 and 130 for maintaining them and the exit gate wheels 104 and 106 in the closed postion. The pipe 541 is also connected by a pipe 543 with the flexible host 386 attached to the ejector fluid motor 350 for maintaining it and the pivoted latch 372 in the retracted position.

The opening of the microswitch 533 results in moving the valve 535 to vent the pipes 541 and 543 and to permit the flow of the air under pressure through the valve 535 and through a pipe 545 connected with the flexible hoses 150 and 154 attached to the exit gate fluid motors 128 and 130, respectively, for moving said fluid motors and the exit gate wheels 104 and 106 from the closed to the open position. At the same time, air under pressure flows through a pipe 547 connected with the pipe 545 and with the flexible hose 383 attached to the other end of the ejector fluid motor 350, moving the motor 350 and pivoted latch 372 to the projected position for ejecting a marked receptacle from the apparatus.

As the ejector fluid motor 350 reaches the projected position, the slide 358 of the ejector engages a closed microswitch 548, mounted on the channel iron 19 and connected with the valve 535 by a power line 549, and moves the microswitch to the open position. The opening of the microswitch 548 results in moving the valve 535 to vent the pipes 546 and 547 and permits air under pressure to flow through the pipes 541 and 543 for moving the exit gate fluid motors 128 and 130 from the open to the closed position and for moving the ejector motor 350 from the projected to the retracted position.

As the ejector fluid motor 350 reaches the retracted position, the slide 358 attached thereto engaged a microswich 551 mounted on the channel iron 19 and connected with the solenoid valve 411 by a power line 553, for moving the valve 411 to a position venting the pipe 415 and permitting air under pressure to flow through the pipe 413 for moving the entrance gate fluid motors 63 and 65 and the entrance gate wheels 39 and 41 attached thereto from the closed to the open position, thus completing an automatic cycle of operation of the apparatus.

The present invention is not limited to the employment of spray guns for marking the receptacles in the apparatus, as fountain brushes or rollers, not shown, supplied with marking material from a reservoir or reservoirs under pressure may be substituted for the present spray guns. The fountain brushes or rollers would engage the surface of the stencils and the surface of the receptacle exposed by the openings in the stencils when moved across the stencils by the fluid motors 196 and 257. When only the side or only the end of a receptacle is to be marked, suitable control valves mounted in the various marking material and air pressure supply lines may be provided.

Current or power is supplied to the power lines connecting the various microswitches and solenoid-actuated valves through the power supply line 555 having a manually actuated switch 557 mounted therein for controlling the supply of electric power to the apparatus.

The various pipes and hoses employed for conducting air under pressure are provided in the conventional manner with appropriate pressure controls, air filters, oilers, air gauges and pet cocks as required. The side and end stencils may be changed or replaced whenever it is required to do so.

A mechanical counter 559 for counting the number of receptacles passing through the apparatus may be secured to the upper surface of the plate 91 for engagement with the receptacles as they are ejected from the apparatus on the conveyors 11 and 13. The counter 559 may include a microswitch connected by a power line 561 with a solenoid-actuated switch 563 mounted in the power supply line 555, for interrupting the supply of power to the apparatus after a predetermined number of receptacles have been marked.

If desired, the microswitches 463 and 533 may be positioned on the apparatus so as to be actuated by the upper end stencil holder 217, when it is moved between the projected and the retracted position, rather than to be actuated by the side stencil holder 217, without affecting the operations of the apparatus as already described.

Should it be desirable under certain conditions, such as in the handling and marking of small or odd-shaped receptacles, it is contemplated that the entire apparatus may be utilized in a vertical rather than in the horizontal position as shown. While entrance and exit gates, which are adapted to be actuated in a sequence of operation, have been shown and described in connection with a preferred form of the invention, these gates could be actuated to open and close simultaneously or the gates could be eliminated entirely and the receptacles moved to and from the marking station in succession by other suitable handling or conveying means. If desired, the present air pressure system and fluid motors may be replaced by electric motors controlled by electric switches.

While a preferred form of my invention has been described and illustrated, such modifications and changes as would be obvious to one skilled in the art are to be considered within the spirit of the invention as defined by the appended claims.

I claim:

1. Apparatus for automatically marking receptacles, comprising: normally open entrance gate means; normally closed exit gate means; means for supporting a receptacle between said entrance and said exit gate means at a marking station; means responsive to a receptacle moved into said marking station for moving said entrance gate means from said open to said closed position; a marking guide movable between a normally retracted position spaced from said receptacle and a projected position in engagement with said receptacle; means responsive to closing of said entrance gate means for moving said marking guide from said retracted to said projected position; marking material applying means; means responsive to movement of said marking guide into said projected position for moving said marking material applying means across said marking guide for marking said receptacle; means responsive to movement of said marking material applying means to the end of its travel across said marking guide for moving said marking guide to its retracted position; means responsive to movement of said marking guide to its retracted position for moving said exit gate means to said open position; and means responsive to removal of said receptacle from said marking station for moving said exit gate means to said closed position and for moving said entrance gate means from said closed to said open position.

2. Apparatus for automatically marking receptacles, comprising: normally open entrance gate means; normally closed exit gate means; means for supporting a receptacle between said entrance and said exit gate means at a marking station; means responsive to a receptacle moved into said marking station for moving said entrance gate means from said open to said closed position; a marking guide movable between a normally retracted position spaced from said receptacle and a projected position in engagement with said receptacle; means responsive to closing of said entrance gate means for moving said marking guide from said retracted to said projected position; marking material spraying means; means for supplying marking material to said spraying means; means responsive to movement of said marking guide into said projected position for spraying marking material from said spraying means onto said marking guide and the portion of said receptacle exposed through openings in said marking guide and for moving said spraying means across said marking guide for marking said receptacle; means responsive to movement of said spraying means to the end of its travel across said marking guide for interrupting the spraying of marking material from said spraying means and for moving said marking guide to its retracted position; means responsive to movement of said marking guide to its retracted position for moving said exit gate means to said open position; and means responsive to said last named means for moving said exit gate means to said closed position and for moving said entrance gate means from said closed to said open position.

3. Apparatus for automatically marking receptacles, comprising: normally open entrance gate means; normally closed exit gate means; means for supporting a receptacle between said entrance and said exit gate means at a marking station; means responsible to a receptacle moved into said marking station for moving said entrance gate means from said open to said closed position; drive means engageable with a receptacle disposed at said marking station and actuatable for rotating said receptacle; means responsive to closing said entrance gate means for actuating said drive means; means for sensing a means to be sensed of said receptacle when said receptacle is rotated to a predetermined position and for deactuating said drive means upon sensing said means to be sensed; a marking guide movable between a normally retracted position spaced from said receptacle and a projected position in engagement with said receptacle; means actuated by said sensing means upon sensing said means to be sensed for moving said marking guide from said retracted to said projected position; marking material applying means; means responsive to movement of said marking guide into said projected position for moving said marking material applying means across said marking guide for marking said receptacle; means responsive to movement of said marking material applying means to the end of its travel across said marking guide for moving said marking guide to its retracted position; means responsive to movement of said marking guide to its retracted position for moving said exit gate means to said open position; and means responsive to removal of said receptacle from said marking station for moving said exit gate means from said open to said closed position and for moving said entrance gate means from said closed to said open position.

4. Apparatus for automatically marking receptacles, comprising: normally open entrance gate means; normally closed exit gate means; means for supporting a receptacle between said entrance and said exit gate means at a marking station; means responsive to a receptacle moved into said marking station for moving said entrance gate means from said open to said closed position; a marking guide movable between a normally retracted position spaced from said receptacle and a projected position in engagement with said receptacle; means responsive to closing of said entrance gate means for moving said marking guide from said retracted to said projected position; marking material applying means; means responsive to movement of said marking guide into said projected position for moving said marking material applying means across said marking guide for marking said receptacle; means responsive to movement of said marking material applying means to the end of its travel across said marking guide for moving said marking guide to its retracted position; means responsive to movement of said marking guide to its retracted position for moving said exit gate means to said open position and for moving said receptacle from said marking station through said exit gate means; and means responsive to said last named means for moving said exit gate means to said closed position and for moving said entrance gate means from said closed to said open position.

5. Apparatus for automatically marking receptacles, comprising: normally open entrance gate means; normally closed exit gate means; means for supporting a receptacle between said entrance and said exit gate means at a marking station; means responsive to a receptacle moved into said marking station for moving said entrance gate means from said open to said closed position; a marking guide movable between a normally retracted position spaced from said receptacle and a projected position in engagement with said receptacle; means responsive to closing of said entrance gate means for moving said marking guide from said retracted to said projected position; marking material applying means; means responsive to movement of said marking guide into said projected position for moving said marking material applying means across said marking guide for marking said receptacle; means responsive to movement of said marking material applying means to the end of its travel across said marking guide for moving said marking guide to its retracted position; ejector means engageable with said receptacle at said marking station and movable from a first to a second position for moving said receptacle from said marking station and through said exit gate means upon movement of said exit gate means to said open position; means responsive to movement of said marking guide to its retracted position for moving said exit gate means to said open position and for moving said ejector means from said first to said second position; and means responsive to movement of said ejector means to said second position for moving said exit gate means from said open to said closed position and for moving said ejector means from said second to said first position; and means responsive to movement of said ejector means to said first position for moving said entrance gate means from said closed to said open position.

6. Apparatus for automatically marking receptacles, comprising: normally open entrance gate means; normally closed exit gate means; means for supporting a receptacle between said entrance and said exit gate means at a marking station; means responsive to a receptacle moved into said marking station for moving said entrance gate means from said open to said closed position; a marking guide movable between a normally retracted position spaced from the side of said receptacle and a projected position in engagement with the side of said receptacle; means responsive to closing of said entrance gate means for moving said marking guide from said retracted to said projected position; marking material applying means; means responsive to movement of said marking guide into said projected position for moving said marking material applying means across said marking guide for marking the side of said receptacle; means responsive to movement of said marking material applying means to the end of its travel across said marking guide for moving said marking guide to its retracted position; means responsive to movement of said marking guide to its retracted position for moving said exit gate means to said open position; and means responsive to removal of said receptacle from said marking station for moving said exit gate means to said closed position and for moving said entrance gate means from said closed to said open position.

7. Apparatus for automatically marking receptacles, comprising: normally open entrance gate means; normally closed exit gate means; means for supporting a receptacle between said entrance and said exit gate means at a marking station; means responsive to a receptacle moved into said marking station for moving said entrance gate means from said open to said closed position; a marking guide movable between a normally retracted position spaced from said receptacle and a projected position in engagement with said receptacle; means responsive to closing of said entrance gate means for moving said marking guide from said retracted to said projected position; marking material spraying means; means responsive to movement of said marking guide into said projected position for moving said marking material spraying means across said marking guide for marking said receptacle; means responsive to movement of said marking material spraying means to the end of its travel across said marking guide for moving said marking guide to its retracted position; means responsive to movement of said marking guide to its retracted position for moving said exit gate means from said closed to an open position; and means responsive to said last named means for moving said exit gate means from said open to said closed position and for moving said entrance gate means from said closed to said open position.

8. Apparatus for automatically marking receptacles, comprising: normally open entrance gate means; normally closed exit gate means; means for supporting a receptacle between said entrance and said exit gate means at a marking station; means responsive to a receptacle moved into said marking station for moving said entrance gate means from said open to said closed position; a first marking guide movable between a normally retracted position spaced from said receptacle and a projected position in engagement with the side of said receptacle; a second marking guide movable between a normally retracted position spaced from said receptacle and a projected position in engagement with one end of said receptacle; means responsive to closing of said entrance gate means for moving said first and second marking guides from said retracted to said projected positions; first marking material applying means; second marking material applying means; means responsive to movement of one of said marking guides into said projected position for simultaneously moving said first and said second marking material applying means across said first and said second marking guides respectively for marking said side and said one end of said receptacle; means responsive to movement of one of said marking material applying means to the end of its travel across the respective marking guide for moving both of said marking guides to their retracted positions; means responsive to movement of one of said marking guides to its retracted position for moving said exit gate means to said open position; and means responsive to removal of said receptacle from said marking station for moving said exit gate means to said closed position and for moving said entrance gate means from said closed to said open position.

9. Apparatus for automatically marking receptacles, comprising: normally open entrance gate means; normally closed exit gate means; means for supporting a receptacle between said entrance and said exit gate means at a marking station; means responsive to a receptacle moved into said marking station for moving said entrance gate means from said open to said closed position; drive means engageable with a receptacle disposed at said marking station and actuatable for rotating said receptacle; means responsive to closing said entrance gate means for actuating said drive means; means for sensing a means to be sensed of said receptacle upon rotation of said receptacle to a predetermined position and for deactuating said drive means upon sensing said means to be sensed; a first marking guide movable between a normally retracted position spaced from said receptacle and a projected position in engagement with the side of said receptacle; a second marking guide movable between a normally retracted position spaced from said receptacle and a projected position in engagement with one end of said receptacle; means responsive to said sensing means upon the sensing of said means to be sensed for moving said first and said second marking guides from said retracted to said projected positions; first marking material spraying means; second marking material spraying means; means responsive to movement of one of said marking guides into said projected position for simultaneously moving said first and said second marking material spraying means from one side to the other side of said first and said second marking guides respectively for marking said side and said one end of said receptacle; means responsive to movement of one of said marking material spraying means to said other side of the respective marking guide for moving both of said marking material spraying means to said one side of their respective marking guides; means responsive to movement of one of said spraying means to said one side for moving both of said marking guides to their retracted positions; means responsive to movement of one of said marking guides to its retracted position for moving said exit gate means to said open position; and means responsive to movement of said receptacle from said marking station and through said exit gate means for moving said exit gate means to said closed position and for moving said entrance gate means from said closed to said open position.

10. Apparatus for automatically marking receptacles, comprising: normally open entrance gate means; normally closed exit gate means; means for supporting a receptacle between said entrance and said exit gate means at a marking station; means responsive to a receptacle moved into said marking station for moving said entrance gate means from said open to said closed position; drive means engageable with a receptacle disposed at said marking station and actuatable for rotating said receptacle; means responsive to closing said entrance gate means for actuating said drive means; means for sensing a means to be sensed of said receptacle upon rotation of said receptacle to a predetermined position and for deactuating said drive means upon sensing said means to be sensed; a first stencil movable between a normally retracted position spaced from said receptacle and a projected position in engagement with the side of said receptacle; a second stencil movable between a normally retracted position spaced from said receptacle and a projected position in engagement with one end of said receptacle; means responsive to said sensing means upon sensing said means to be sensed for moving said first and said second stencils from said retracted to said projected positions; first marking material spraying means; second marking material spraying means; means responsive to movement of one of said stencils into said projected position for simultaneously moving said first and said second marking material spraying means from one side to the other side of said first and said second stencils respectively for marking said side and said one end of said receptacle; means responsive to movement of one of said marking material spraying means to said other side of the respective stencil for moving both of said marking material spraying means to said one side of their respective stencils; means responsive to movement of one of said spray gun means to said one side for moving both of said stencils to their retracted positions; a normally retracted ejector movable between a retracted and a projected position for moving a receptacle from said marking station and through said exit gate means when in the open position; means responsive to movement of one of said stencils to its retracted position for moving said exit gate means to said open position and for moving said ejector from a retracted to a projected position; means responsive to movement of said ejector to said projected position for moving said exit gate means to said closed position and for moving said ejector to said retracted position; and means responsive to movement of said ejector to said retracted position for moving said entrance gate means from said closed to said open position.

11. Apparatus for automatically marking receptacles, comprising: normally open entrance gate means; normally closed exit gate means; means for supporting a receptacle between said entrance and said exit gate means at a marking station; means responsive to a receptacle moved into said marking station for moving said entrance gate means from said open to said closed position; drive means engageable with a receptacle disposed at said marking station and actuatable for rotating said receptacle; means responsive to closing said entrance gate means for actuating said drive means; means for sensing a means to be sensed of said receptacle upon rotation of said receptacle to a predetermined position and for deactuating said drive means upon sensing said means to be sensed; a stencil movable between a normally retracted position spaced from said receptacle and a projected position in engagement with the side of said receptacle; means responsive to said sensing means sensing said means to be sensed for moving said stencil from said retracted to said projected position; marking material spraying means; means responsive to movement of said stencil into said projected position for moving said marking material spraying means from one side to the other side of said stencil for marking said receptacle; means responsive to movement of said marking material spraying means to said other side of the stencil for moving said marking material spraying means to said one side of said stencil; means responsive to movement of said spray gun means to said one side for moving said stencil to said retracted position; a normally retracted ejector movable between a retracted and a projected position for moving a receptacle from said marking station and through said exit gate means when in the open position; means responsive to movement of said stencil to its retracted position for moving said exit gate means to said open position and for moving said ejector from a retracted to a projected position; means responsive to movement of said ejector to said projected position for moving said exit gate means to said closed position and for moving said ejector to said retracted position; and means responsive to movement of said ejector to said retracted position for moving said entrance gate means from said closed to said open position.

12. Apparatus for automatically marking receptacles, comprising: normally open entrance gate means; power means connected to said entrance gate means operable for moving said entrance gate means between said normally open and a closed position; normally closed exit gate means; power means connected to said exit gate means operable for moving said exit gate means between said normally closed and an open position; means for supporting a receptacle between said entrance and said exit gate means at a marking station; marking guide means; power means connected to said marking guide means operable for moving said marking guide means between a normally retracted position spaced from said receptacle and a projected position in engagement with one end of said receptacle; marking material spray gun means; power means connected to said spray gun means and operable to move said spray gun means across said marking guide means when it is in the projected position; control means operably connected with said entrance gate power means and responsive to a receptacle moved into said marking station for moving said entrance gate means from said open to said closed position; control means responsive to closing of said entrance gate means for moving said marking guide into said projected position; control means connected with said spray gun power means and responsive to movement of said marking guide means into said projected position for moving said spray gun across said marking guide and for spraying marking material from said spray gun for marking said receptacle; control means operably connected with said marking guide power means and responsive to movement of said spray gun means to the end of its travel across said marking guide for interrupting the spraying of marking material from said spray gun and for moving said marking guide means to its retracted position; control means operably connected with said exit gate power means and responsive to movement of said marking guide means to its retracted position for moving said exit gate means from said closed to said open position; and control means operably connected with said exit gate power means and responsive to removal of said receptacle from said marking station for moving said exit gate means from said open to said closed position and for moving said entrance gate means from said closed to said open position.

13. Apparatus for automatically marking receptacles, comprising: entrance gate means; power means connected to said entrance gate means operable for moving said entrance gate means between a normally open and a closed position; exit gate means; power means connected to said exit gate means operable for moving said exit gate means between a normally closed and an open position; means for supporting a receptacle between said entrance and said exit gate means at a marking station; drive means at said marking station engageable with a receptacle disposed at said marking station and operable to rotate said receptacle; sensing means controlling operation of said receptacle rotating drive means; power means connected with said sensing means and operable to move said sensing means between a normally retracted position spaced from the receptacle and a projected position in the path of rotation of a bung mounted in one end of said receptacle; a first stencil; power means connected with said first stencil and operable for moving said first stencil between a normally retracted position spaced from said receptacle and a projected position in engagement with the side of said receptacle; a second stencil; power means connected with said second stencil operable for moving said second stencil between a normally retracted position spaced from said receptacle and a projected position in engagement with said one end of said receptacle; first spray gun means; power means connected with said first spray gun means and operable to move said first spray gun means from one side to the other side of said first stencil; second spray gun means; power means connected with said second spray gun means and operable to move said second spray gun means from one side to the other side of said second stencil; normally retracted ejector means at said marking station engageable with said receptacle at said marking station; power means connected with said ejector means and operable to move said ejector means between said retracted position and a projected position for ejecting said receptacle from said marking station and through said exit gate means upon movement of said exit gate means to the open position; control means at said marking station connected with said entrance gate power means and engageable by a receptacle moved into said marking station for operating said entrance gate power means and moving said entrance gate means from said open to said closed position; control means engageable by said entrance gate means upon movement of said entrance gate means to said closed position and connected with said receptacle rotating drive means and with said sensing means power means for operating said receptacle rotating drive means and for operating said sensing means power means to move said sensing means to said projected position, engagement of said bung with said sensing means interrupting operation of said drive means and operating said sensing means power means to move said sensing means to the retracted position; control means connected with said first and said second stencil power means and actuated by said sensing means when it is moved to said retracted position for moving said first and said second stencils into said projected positions; control means connected with said first and said second spray gun power means and actuated by one of said first and said second stencils when in said projected position for operating said first and said second spray guns power means and moving said first and said second spray gun means from said one side to said other side of said first and said second stencils respectively for marking said receptacle; control means connected with said power means of said first and said second spray gun power means and engageable by one of said first and said second spray gun means at the end of its movement to said other side of its corresponding stencil for operating said first and said second spray gun power means and moving said first and said second spray gun means from said other side to said one side of their respective stencils; control means connected with said first and said second stencil power means and engageable by one of said first and said second spray gun means at the end of its movement to said one side of its stencil for moving said first and said second stencils to their respective retracted positions; control means connected with said exit gate power means and with said ejector power means and engaged by one of said first and said second stencils when in said moved to the retracted position for operating said exit gate power means and said ejector power means for moving said exit gate means from said closed to said open position and for moving said ejector means from said retracted to said projected position; control means connected with said ejector power means and with said exit gate power means and engageable by said ejector means when moved to said projected position for operating said ejector power means and said exit gate power means and moving said exit gate means to said closed position and for moving said ejector to said retracted position; and control means connected with said entrance gate power means and engaged by said ejector means when moved to said retracted position for operating said entrance gate power means and moving said entrance gate means from said closed to said open position.

14. Apparatus for automatically marking receptacles, comprising: normally open entrance gate means; power means connected with said entrance gate means operable for moving said entrance gate means between said normally open and a closed position; normally closed exit gate means; power means connected with said exit gate means operable for moving said exit gate means between said normally closed and an open position; means for supporting a receptacle between said entrance and said exit gate means at a marking station; a marking guide; power means connected with said marking guide and operable for moving said marking guide between a normally retracted position spaced from said receptacle and a projected position in engagement with said receptacle; marking material applying means; power means connected with said marking material applying means and operable to move said marking material applying means across the surface of said marking guide when it is in the projected position; control means operably connected with said entrance gate power means and responsive to a receptacle moved into said marking station for moving said entrance gate means from said open to said closed position; control means operably connected with said marking guide power means and responsive to closing of said entrance gate means for moving said marking guide from said retracted to said projected position; control means connected with said power means of said marking material applying means and responsive to movement of said marking guide into said projected position for moving said marking material applying means across the surface of said marking guide for applying marking material to said receptacle through openings in said marking guide and marking said receptacle; control means operably connected with said marking guide power means and responsive to movement of said marking material applying means to the end of its travel across said marking guide for moving said marking guide means to its retracted position; control means operably connected with said exit gate power means and responsive to movement of said marking guide to its retracted position for moving said exit gate means from said closed to said open position; and control means operably connected with said exit gate power means and with said entrance gate power means and responsive to moving said receptacle from said marking station for moving said exit gate means from said open to said closed position and for moving said entrance gate means from said closed to said open position.

15. Apparatus for automatically marking receptacles, comprising: normally open entrance gate means; power means connected with said entrance gate means operable for moving said entrance gate means between said normally open and a closed position; normally closed exit gate means; power means connected with said exit gate means operable for moving said exit gate means between said normally closed and an open position; means for supporting a receptacle between said entrance and said exit gate means at a marking station; a stencil; power means connected with said stencil and operable for moving said stencil between a normally retracted position spaced from said receptacle and a projected position in engagement with said receptacle; marking material spraying means; power means connected with said marking material spraying means and operable to move said marking material spraying means between one side and the other side of said stencil when said stencil is in the projected position; control means operably connected with said entrance gate power means and responsive to a receptacle moved into said marking station for moving said entrance gate means from said open to said closed position; control means operably connected with said stencil power means and responsive to closing of said entrance gate means for moving stencil into said projected position; control means connected with said power means connected with said marking material spraying means and responsive to movement of said stencil into said projected position for moving said marking material spraying means from said one side to said other side of said stencil for spraying marking material onto said receptacle through openings in said stencil and marking said receptacle; control means operably connected with said stencil power means and responsive to movement of said marking material spraying means to said other side of said stencil for moving said stencil means to its retracted position and for moving said marking material spraying means from said other side to said one side of said stencil; control means operably connected with said exit gate power means and responsive to movement of said stencil to its retracted position for moving said exit gate means from said closed to said open position; and control means operably connected with said exit gate power means and with said entrance gate power means and responsive to moving said receptacle from said marking station for moving said exit gate means from said open to said closed position and for moving said entrance gate means from said closed to said open position.

16. Apparatus for automatically marking receptacles, comprising: normally open entrance gate means; power means connected with said entrance gate means operable for moving said entrance gate means between said normally open and a closed position; normally closed exit gate means; power means connected with said exit gate means operable for moving said exit gate means between said normally closed and an open position; means for supporting a receptacle between said entrance and said exit gate means at a marking station; a stencil; power means connected with said stencil and operable for moving said stencil between a normally retracted position spaced from said receptacle and a projected position in engagement with said receptacle; marking material spraying means; power means connected with said marking material spraying means and operable to move said marking material spraying means between one side and the other side of said stencil when said stencil is in the projected position; ejector means; power means connected with said ejector means and operable to move said ejector means between a retracted position and a projected position for ejecting said receptacle from said marking station and through said exit gate means when said exit gate means is in the open position; control means operably connected with said entrance gate power means and responsive to a receptacle moved into said marking station for moving said entrance gate means from said open to said closed position; control means operably connected with said stencil power means and responsive to closing of said entrance gate means for moving stencil from said retracted to said projected position; control means connected with said power means connected with said marking material spraying means and responsive to movement of said stencil into said projected position for moving said marking material spraying means from said one side to said other side of said stencil for spraying marking material onto said receptacle through openings in said stencil and marking said receptacle; control means operably connected with said stencil power means and responsive to movement of said marking material spraying means to said other side of said stencil for moving said stencil means to its retracted position and for moving said marking material spraying means from said other side to said one side of said stencil; control means operably connected with said exit gate power means and with said ejector means power means and responsive to movement of said stencil to its retracted position for moving said exit gate means from said closed to said open position and for moving said ejector from said retracted to said projected position; control means operably connected with said exit gate power means and with said ejector means and responsive to movement of said ejector means to said projected position for moving said exit gate means from said open to said closed position and for moving said ejector means from said projected to said retracted position; and control means operably connected with said entrance gate means power means and responsive to movement of said ejector means to said retracted position for moving said entrance gate means from said closed to said open position.

17. Apparatus for automatically marking receptacles, comprising: normally open entrance gate means; power means connected with said entrance gate means operable for moving said entrance gate means between said normally open and a closed position; normally closed exit gate means; power means connected with said exit gate means operable for moving said exit gate means between said normally closed and an open position; means for supporting a receptacle between said entrance and said exit gate means at a marking station; drive means engageable with a receptacle disposed at said marking station and operable to rotate said receptacle; sensing means controlling operation of said receptacle rotating power means; power means connected with said sensing means for moving said sensing means between a normally retracted position spaced from said receptacle and a projected position in the path of a closure carried by said receptacle; a stencil; power means connected with said stencil and operable for moving said stencil between a normally retracted position spaced from said receptacle and a projected position in engagement with said receptacle; marking material spraying means; power means connected with said marking material spraying means and operable to move said marking material spraying means between one side and the other side of said stencil when said stencil is in the projected position; ejector means; power means connected with said ejector means and operable to move said ejector means between a retracted position and a projected position for ejecting said receptacle from said marking station and through said exit gate means when said exit gate means is in the open position; control means operably connected with said entrance gate power means and responsive to a receptacle moved into said marking station for moving said entrance gate means from said open to said closed position; control means connected with said sensing means power means and responsive to movement of said entrance gate means to said closed position for moving said sensing means from said retracted to said projected position and for operating said drive means; control means connected with said sensing means power means and with said drive means responsive to movement of said closure into engagement with said sensing means for interrupting operation of said drive means and for moving said sensing means from said projected to said retracted position; control means operably connected with said stencil power means and responsive to movement of said sensing means to said retracted position for moving said stencil from said retracted to said projected position; control means connected with said marking material spraying means power means and responsive to movement of said stencil into said projected position for moving said marking material spraying means from said one side to said other side of said stencil for spraying marking material onto said receptacle through openings in said stencil and marking said receptacle; control means operably connected with said stencil power means and responsive to movement of said marking material spraying means to said other side of said stencil for moving said stencil means to its retracted position and for moving said marking material spraying means from said other side to said one side of said stencil; control means operably connected with said exit gate power means and with said ejector means power means and responsive to movement of said stencil to its retracted position for moving said exit gate means from said closed to said open position and for moving said ejector from said retracted to said projected position; control means operably connected with said exit gate power means and with said ejector means power means and responsive to movement of said ejector means to said projected position for moving said exit gate means from said open to said closed position and for moving said ejector means from said projected to said retracted position; and control means operably connected with said entrance gate means power means and responsive to movement of said ejector means to said retracted position for moving said entrance gate means from said closed to said open position.

18. Apparatus for automatically stenciling receptacles, comprising: normally open entrance gate means; power means connected with said entrance gate means operable for moving said entrance gate means between said normally open and a closed position; normally closed exit gate means; power means connected with said exit gate means operable for moving said exit gate means between said normally closed and an open position; means for supporting a receptacle between said entrance and said exit gate means at a stenciling station; drive means engageable with a receptacle disposed at said stenciling station and operable to rotate said receptacle; sensing means; power means connected with said sensing means for moving said sensing means between a normally retracted position spaced from said receptacle and a projected position in the path of a closure carried by said receptacle; a stencil; power means connected with said stencil and operable for moving said stencil between a normally retracted position spaced from said receptacle and a projected position in engagement with said receptacle; paint spraying means; power means connected with said paint spraying means and operable to move said paint spraying means between one side and the other side of said stencil when said stencil is in the projected position; control means operably connected with said entrance gate power means and responsive to a receptacle moved into said stenciling station for moving said entrance gate means from said open to said closed position; control means connected with said sensing means power means and responsive to movement of said entrance gate means to said closed position for moving said sensing means from said retracted to said projected position and for operating said drive means; control means connected with said sensing means power means and with said drive means responsive to movement of said closure into engagement with said sensing means for interrupting operation of said drive means and for moving said sensing means from said projected to said retracted position; control means operably connected with said stencil power means and responsive to movement of said sensing means to said retracted position for moving said stencil from said retracted to said projected position; control means connected with said paint spraying means power means and responsive to movement of said stencil into said projected position for moving said paint spraying means from one side to said other side of said stencil for spraying paint onto said receptacle through openings in said stencil and stenciling said receptacle; control means operably connected with said stencil power means and responsive to movement of said paint spraying means to said other side of said stencil for moving said stencil means to its retracted position and for moving said paint spraying means from said other side to said one side of said stencil; control means operably connected with said exit gate power means and responsive to movement of said stencil to its retracted position for moving said exit gate means from said closed to said open position; and control means operably connected with said exit gate power means and with said entrance gate means power means and responsive to movement of said receptacle from said stenciling station and through said exit gate means for moving said exit gate means from said open to said closed position and for moving said entrance gate means from said closed to said open position.

19. Apparatus for automatically marking receptacles, comprising: means for supporting a receptacle at a marking station; means for automatically supplying a succession of receptacles, one at a time, to said marking station; receptacle marking means disposed adjacent said marking station and movable between a normally retracted, non-marking position spaced from a receptacle at said marking station and a projected, marking position in proximity to a receptacle at said marking station; means responsive to the positioning of a receptacle at said marking station for automatically moving said receptacle marking means from said retracted to said projected position and for marking said receptacle; means responsive to the completion of marking of a receptacle disposed at said marking station for automatically moving said receptacle marking means from said projected to said retracted position; and means responsive to movement of said receptacle marking means to said retracted position for automatically removing a marked receptacle from said marking station.

20. Apparatus for automatically marking receptacles in accordance with claim 19 in which said means for automatically supplying receptacles to said marking station is actuated in response to removal of a marked receptacle from said marking station for supplying a succeeding receptacle to said marking station.

21. Apparatus for automatically marking receptacles in accordance with claim 20 wherein said means responsive to the positioning of a receptacle at said marking station rotates the receptacle to a predetermined position with a filling opening of the receptacle in an oriented location relative to said apparatus prior to moving said marking means from said retracted to said projected position.

22. Apparatus for automatically marking receptacles in accordance with claim 21 wherein said receptacle marking means includes a first marking means disposed adjacent the side of the receptacle and a second marking means disposed adjacent one end of the receptacle for marking both the side and the end of the receptacle.

References Cited
UNITED STATES PATENTS

| | | | |
|---|---|---|---|
| 2,700,929 | 2/1955 | Williams | 101—114 |
| 2,739,531 | 3/1956 | Hagerman | 101—126 |
| 3,127,833 | 4/1964 | Rudolph et al. | 101—126 |
| 3,311,051 | 3/1967 | Rudolph et al. | 101—40 |

WILLIAM B. PENN, *Primary Examiner.*